(12) United States Patent
Vemuri et al.

(10) Patent No.: US 8,935,257 B1
(45) Date of Patent: Jan. 13, 2015

(54) ORGANIZING, JOINING, AND PERFORMING STATISTICAL CALCULATIONS ON MASSIVE SETS OF DATA

(71) Applicant: LinkedIn Corporation, Mountain View, CA (US)

(72) Inventors: Srinivas S. Vemuri, Santa Clara, CA (US); Maneesh Varshney, San Jose, CA (US); Krishna P. Puttaswamy Naga, Sunnyvale, CA (US); Rui Liu, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/216,752

(22) Filed: Mar. 17, 2014

(51) Int. Cl.
  *G06F 17/30* (2006.01)
  *G06F 7/00* (2006.01)

(52) U.S. Cl.
  CPC .............................. *G06F 17/30336* (2013.01)
  USPC ........................................................ 707/741

(58) Field of Classification Search
  USPC ........................................................ 707/741
  See application file for complete search history.

(56) References Cited

U.S. PATENT DOCUMENTS

2012/0203740 A1* 8/2012 Ben-Dyke et al. ............ 707/639
2012/0284235 A1* 11/2012 Swett et al. ................... 707/668

* cited by examiner

*Primary Examiner* — Kuen Lu
(74) *Attorney, Agent, or Firm* — Park, Vaughan, Fleming & Dowler LLP

(57) ABSTRACT

A system, method, and apparatus are provided for organizing and joining massive sets of data (e.g., tens or hundreds of millions of event records). A dataset is Blocked by first identifying a partition key, which comprises one or more columns of the data. Each Block will contain all dataset records that have partition key values assigned to that Block. A cost constraint (e.g., a maximum size, a maximum number of records) may also be applied to the Blocks. A Block index is generated to identify all Blocks, their corresponding (sequential) partition key values, and their locations. A second dataset that includes the partition key column(s) and that must be correlated with the first dataset may then be Blocked according to the same ranges of partition key values (but without the cost constraint). Corresponding Blocks of the datasets may then be Joined/Aggregated, and analyzed as necessary.

28 Claims, 7 Drawing Sheets

ORGANIZING, JOINING, AND PERFORMING STATISTICAL CALCULATIONS ON MASSIVE SETS OF DATA

BACKGROUND

This invention relates to the fields of computer systems and data processing. More particularly, a system, method, and apparatus are provided for organizing, joining and then performing calculations on massive sets of data.

Computing systems that host communication services, news sources, social networking sites, retail sales, and/or other services process large amounts of data. Different datasets may be assembled for different applications, different application features, or for other purposes, but may be inter-related. As a simple example, an organization that sells a product may maintain one dataset comprising communications (e.g., electronic mail messages) sent by all of its salespeople, and another dataset correlating those salespeople with the clients they service. To obtain a report indicating how often each salesperson communicates with his or her clients, for example, typically the two entire datasets would be joined and then processed in some manner.

Some organizations, however, need to correlate, analyze, or otherwise process tens or hundreds of millions of records, or more—such as an organization that operates a social networking site or a popular communication application and that assembles voluminous data regarding its members' activities. Joining datasets within this type of environment could yield an intermediate collection of data amounting to tens or hundreds of terabytes. Generating this huge data collection and performing queries or other processing to extract desired information could therefore take a significant amount of time (e.g., many hours)—so much time, in fact, as to make the resulting information obsolete by the time it is produced.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention associated with this disclosure is not intended to be limited to the embodiments shown, but rather is to be accorded the widest scope consistent with the disclosure.

In some embodiments, a system, method, and apparatus are provided for strategically organizing a voluminous set of data into "Blocks" so as to facilitate analysis of the data. In these embodiments, a selected column or field of the data is used as a partition key, and each Block includes non-overlapping subsets of values for the partition key. In other words, each "Block" of data corresponds to one or more values in the partition key field, and all data records in the set of data having any of those values in the partition key field are combined in one Block. In other embodiments, multiple combined columns or fields may serve as the partition key.

This data organization (or reorganization) allows subsequent data operations (e.g., Join, Aggregate) to be performed in memory, thereby allowing data operations to be performed at main memory speed and avoiding input/output operations involving slower data storage devices. For example, another dataset that features the partition key column(s) or field(s) can also be Blocked using the same subsets of values. Thus, each corresponding pair of Blocks—one from each dataset—contains all records that contain a partition key value within the subset.

Because the size of the Blocks may be strategically limited (e.g., according to the size of a memory page, based on the size of a process' memory space), the corresponding blocks can be Joined at memory speeds. When the total amount of data being manipulated is measured in terabytes, for example, this can greatly speed the data processing.

Embodiments described herein may include multiple processes that operate sequentially and/or in parallel. For example, different processes may function to partition or Block datasets, Join corresponding Blocks from two or more different datasets, aggregate the Joined data, etc.

Figure 1:
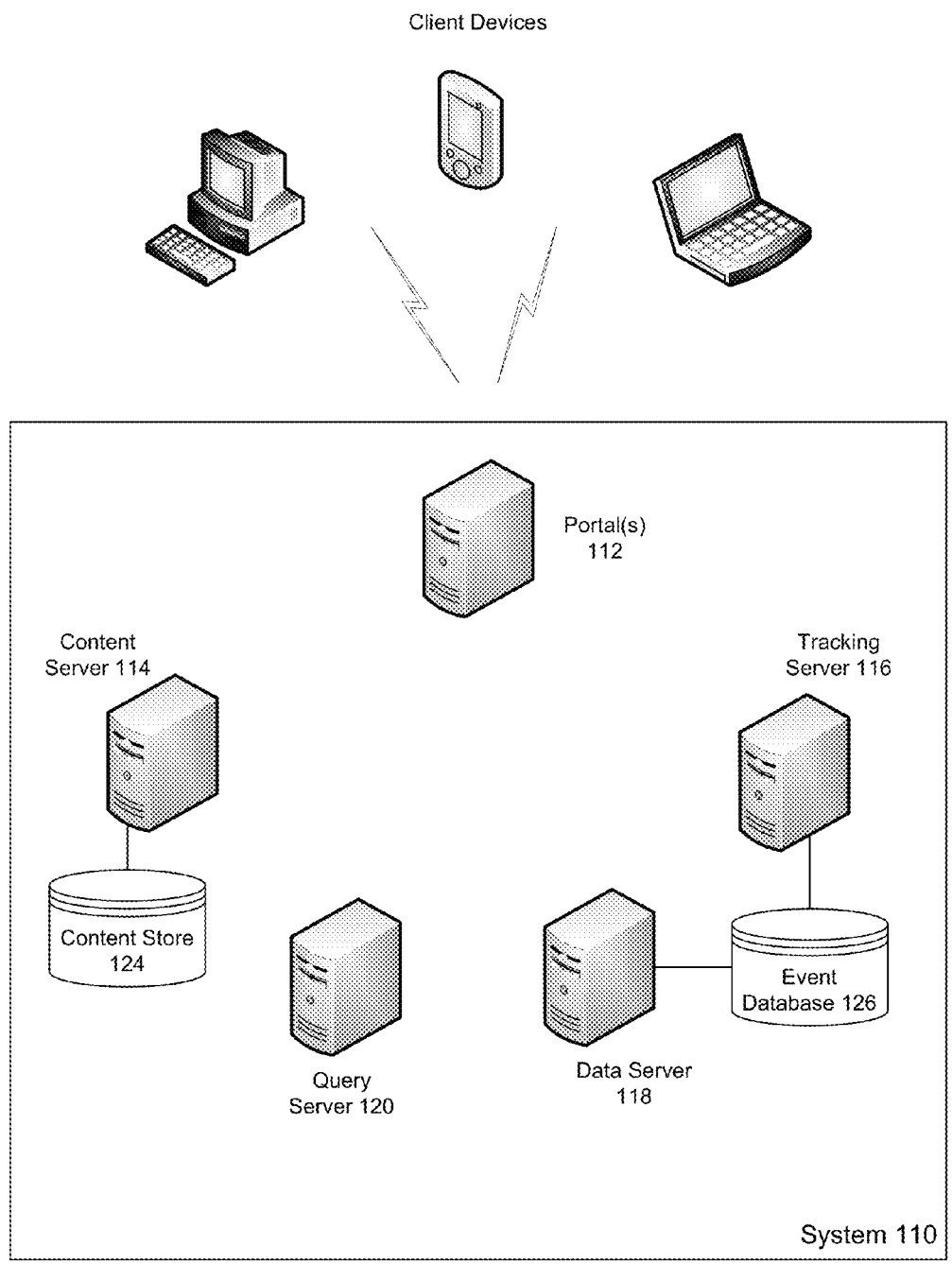
FIG. 1 is a block diagram of a system in which massive sets of inter-related data are generated and must be analyzed, in accordance with some embodiments.

FIG. 1 is a block diagram of a system in which massive amounts of data are generated and processed. System 110 may be implemented as or within a data center or other computing system.

In some particular implementations, system 110 is operated within a professional networking service or system that helps members create, develop, and maintain professional (and personal) relationships, as provided by LinkedIn® Corporation, for example.

Members or users of a service offered by system 110 connect to the system via client devices, which may be stationary (e.g., desktop computer, workstation) or mobile (e.g., smart phone, table computer, laptop computer). The client devices operate suitable client applications, such as a browser program or an application designed specifically to access the service(s) offered by system 110. Users of system 110 may be termed members because they may be required to register with the system in order to fully access the system's services.

User connections are generally made through a portal 112, which may comprise an application server, a web server, and/or some other gateway or entry point. System 110 also includes one or more of content server 114, tracking server 116, data server 118, query server 120, content store 124, and event database 126.

As part of the services it offers, system 110 serves content for presentation to users via their client devices. The content that is served may include advertisements, offers, announcements, job listings, status updates, news, messages, and so on, and may be or may include any type of media (e.g., text, images, video, audio). System 110 may serve content generated by or among users of the system's services, and/or content supplied by third parties for delivery to users of those services.

Members of the service have corresponding pages (e.g., web pages, content pages) on system 110, which they may use to facilitate their activities with the system and with each other. These pages (or information provided to members via these pages) are available to some or all other members to visit in order to browse messages, announcements, and/or other information provided by or associated with the corresponding member.

Tracking server 116 monitors and records (e.g., in event database(s) 126) activity of system 110 and/or members. For example, whenever content is served from portal 112 or content server 114 (e.g., to a client device), the tracking server may record what is served, to whom (e.g., which member), when it was served, and/or other information. Similarly, the tracking server also records member actions regarding advertisements and/or other content presented to the members, to include identities of the member and the content acted upon, the action that was taken (e.g., click, conversion, follow-on request, visiting a page associated with a subject or provider of the content), when the action was taken, etc.

In embodiments described herein, tracking server 116 and/or other components of system 110 accumulate massive sets of data regarding user (or member) activities. The amount of data accumulated may depend on the number of metrics that are captured, the number of users whose activities are captured, the period of time for which activities are captured, and/or other factors.

Content server 114 maintains one or more repositories of content items for serving to members (e.g., content store 124), an index of the content items, and/or other information useful in serving content to members. Illustratively, content server 114 may serve on the order of hundreds of millions of content items every day, for each of which tracking server 116 stores an event record (in addition to data reflecting other user activity, as described above).

Content store 124 may include various types of content and content items, including advertisements (e.g., both revenue and non-revenue ads), information (e.g., announcements, messages) released by members (and possibly non-members), status updates, job listings, media content (e.g., images, video, audio), documents, and so on, for serving to members and/or for use by various components of system 110. Content server 114 (or some other component of system 110) may include a recommendation module for recommending content to serve to a member.

As described in more detail below, data server 118 operates to process data (e.g., from event database 126) and respond to queries from query server 120 and/or other entities, and may also periodically (or continually) organize or re-organize the data as described herein. For example, the data server may perform an initial Blocking of a dataset and, afterward, the Blocks or the entire dataset may be updated incrementally as new data are received (e.g., every hour, every day, every three days).

Query server 120 operates to configure or reconfigure queries submitted (or to be submitted) to data server 118. For example, a system operator, a member, or some other entity may submit a preconfigured query or a newly configured query (e.g., in Structured Query Language or SQL) to query server 120, and the query server may reconfigure the query for application against the Blocked data managed by data server 118. The form of a query may affect how data server 118 Blocks the dataset(s) that must be analyzed in order to respond to the query. For example, a given collection of datasets may be Blocked in one way (e.g., with one partition key) for responding to one query, and may be Blocked in another way (e.g., with a different partition key) to facilitate a response to another query.

System 110 may include other components not illustrated in FIG. 1. For example, in some embodiments system 110 may include a profile server to maintain profiles, in a profile database, of members of the service(s) hosted by system 110.

An individual member's profile may reflect any number of attributes or characteristics of the member, including personal (e.g., gender, age or age range, interests, hobbies, member ID), professional (e.g., employment status, job title, functional area or industry, employer, skills, endorsements, professional awards), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify who sent a message, to identify a recipient of a status update, to record a content-delivery event).

Organizations may also be members of the service (i.e., in addition to individuals), and may have associated descriptions or profiles comprising attributes such as industry (e.g., information technology, manufacturing, finance), size, location, goal, etc. An "organization" may be a company, a corporation, a partnership, a firm, a government agency or entity, a not-for-profit entity, an online community (e.g., a user group), or some other entity formed for virtually any purpose (e.g., professional, social, educational).

System 110 may also store, for each member of the service hosted by system 110, a record of content items served to the member, or served for presentation to the member, and when they were served. Such a data store may be configured to allow the content server and/or other components of system 110 to quickly determine whether a particular content item was previously presented to a particular member, how many times it was presented, when it was presented, how it was presented (e.g., how prominently or where it was presented within a web page or other page of content), and/or other information. Although some of this data may duplicate what is stored in event database 126, contents of this user data store would be rapidly accessible to one or more other servers (e.g., especially content server 114), and may be used, for example, to help select a content item to serve in response to a current request.

Although not shown in FIG. 1, system 110 may include multiple computers for parallel processing of system data. For example, data server 118 may instead be a collection of tens or hundreds of separate computers, each of which hosts one or more processes, with all processes operating in parallel to perform data processing operations described herein.

The functionality of system 110 may be distributed among the illustrated components in an alternative manner, such as by merging or further dividing functions of one or more components, or may be distributed among a different collection of components. Yet further, while implemented as separate hardware components (e.g., computer servers) in FIG. 1, one or more of portal 112, content server 114, tracking server 116, data server 118, and query server 120 may alternatively be implemented as separate software modules executing on one or more computer servers. Although only single instances of each component of system 110 are illustrated in FIG. 1, it should be understood that multiple instances of some or all components may be utilized.

In an online system such as system 110, massive amounts of data regarding user activities are generated, and an organization that operates the system may wish to extract meaning from those data. For example, an example dataset may reflect one or more metrics that are desired regarding specific members (and/or across multiple or all members), such as how many unique pages of other members they viewed, the average number of pages they viewed, what types of content they accessed most frequently, how many communications they initiated, how many job opportunities they viewed, etc. Depending on a time range of interest (e.g., one day, one hour, one month, all time), the data that must be processed to yield the metric(s) may swell accordingly.

Another example dataset that may be generated within system 110 is a set of data regarding testing or experimentation, such as A/B testing. Operators of the system may, for example, wish to test different versions of a particular page or content item (e.g., image, advertisement), and may serve those different versions to different members, at different times, with some variation regarding size, shape, color, and/or other characteristic. This dataset would therefore reflect what experiments (and/or variations) were exposed to which members, and when.

However, not all data regarding all user activities and system activities are likely to be stored in a single database or data repository, due to the sheer volume of data involved. For example, different datasets may store data regarding different user metrics or types of user activity (e.g., page views, clicks, conversions, messages sent, profiles viewed), activities involving different types of content, activities occurring different time periods, etc. Therefore, extracting meaningful and accurate information from the voluminous data may require correlation or aggregation of multiple separate datasets.

In particular, and for the example datasets introduced immediately above, daily metrics of each member and daily data regarding the experiments/variants they were exposed to may be stored in separate databases (or other types of repositories). The information desired from the accumulated data may illustratively include mean metric values and variances of metric values among members exposed to a specific experiment (or a specific variation of an experiment) within a given date range. Obtaining the information may require multiple iterations for each experiment (e.g., hundreds of separate experiments), each variant (e.g., tens of variants for each experiment), and various time periods (e.g., hundreds of time ranges).

As another example, a professional networking system may maintain separate datasets for member connections, to identify for each given member other members that the given member is connected to (e.g., as friends or associates), and for members' personal/professional attributes (e.g., employer, work location, job history, university attended). In order to identify members' $N^{th}$-degree connections (e.g., $2^{nd}$ degree, $3^{rd}$ degree) who have any overlapping attributes (or who overlap in one or more specific attributes), both datasets must be analyzed.

To continue this example, if group memberships are also stored in a separate dataset, then multiple datasets must also be analyzed simply to identify connected members who are common members of any (or a specific) group.

The following discussion of different embodiments is not intended to limit their application to the few example use cases cited herein. In general, and as one of ordinary skill in the art will appreciate, professional networking sites, social networking sites, online dating sites, retail sales sites, and other online services accumulate vast quantities of specialized, multi-dimensional data in separate but related datasets, and useful information can be assembled by combining, correlating, or otherwise analyzing those relations in many different ways. Often, the more information that is considered or processed, the more meaningful or persuasive will be the result.

Because of the fragmentation or segregation of accumulated data into separate datasets, many queries designed to extract useful information from the plethora of accumulated data may require aggregating, merging, or otherwise combining multiple datasets or relevant portions of multiple datasets. Combining tens or hundreds of millions of records from multiple datasets would traditionally yield a collection of data spanning terabytes of storage, and analyzing it would require batch processing that is slowed by the need to constantly swap portions of the data between memory and secondary storage (e.g., disk) and save intermediate results.

As described previously, though, methods provided herein allow massive sets of data to be intelligently "Blocked" so as to promote easy combination with relevant extracts of other data sets and promote fast Joining and Aggregating, at memory speeds, for example.

In different implementations, a given dataset may be Blocked on the basis of different data columns or fields. In particular, any single column or any combination of multiple dimensions or columns of the dataset may serve as the partition key for Blocking the dataset. Thus, one dataset may be Blocked by member identity (e.g., member ID values), while another may be Blocked by content item identity, yet another may be Blocked using a combination of member ID and a date/time, etc.

In an illustrative scenario that may be encountered by system 110 of FIG. 1, datasets that it manipulates include a first dataset that stores metrics accumulated from user activities within the service(s) provided by the system, and a second dataset that stores results of experiments (e.g., A/B testing) conducted within the system.

More particularly, a "Metrics" dataset stores billions of records that report a corresponding value for each combination of metric and a member. Illustrative metrics include, but are in no way limited to: number of page views, number of unique page views, number of messages (e.g., electronic mail, instant message) sent or received, number of times the user clicked on or converted an advertisement, number of content items shared by the user, etc. The dataset may reflect a single day, a portion of a day, multiple days, or any other time period. Illustratively, the system or service may have hundreds of millions of (e.g., 300 million) members and may track hundreds (e.g., 400-500) of metrics. Thus, the Metrics dataset may be very large.

An "Experiments" dataset also stores billions of records, but these records indicate which experiment, and which variant of the experiment, a given member was exposed to on a particular date or at a particular time. Illustrative experiments may involve showing or not showing a particular content page or link, displaying an image in a particular page of content, offering a particular content item, exposing a new feature of the service or system, and so on. Different variants of an experiment may, for example, be different images or image resolutions/sizes, change different characteristics of the content item (e.g., color, size, shape, position, text), have different functionality enabled in the new feature, etc.

In this illustrative scenario, the entity that accumulated the Metrics and Experiments datasets (e.g., system 110 of FIG. 1) wishes to determine the effects that different experiments/variants have upon the members' metrics. This naturally requires some correlation between the two datasets.

A management file or pre-compute file may also exist, to identify each experiment and relevant dates. The dates may identify the starting and ending date of an experiment (or variant) and/or one or more time periods of interest (e.g., for which metric information is desired). For example, a given experiment (or variant) may run for a specified time period (e.g., two or three months), but results of the experiments (and/or variants) may be desired for some particular windows of time during that period (e.g., every day, every three days, every week, every three weeks). Thus, for each experiment identified in the management file (or experiment and variant combination), any number of time ranges may be specified. In some implements, on the order of 50 to 100 time ranges may be identified for each experiment/variant included in the management file.

The information in the management file allows the system to assemble all the data needed from the two large datasets. More specifically, when the effect of a given experiment on member metrics is desired, that effect can only appear during (and/or after) the period of time the experiment is active. Although some data from before that time period may be separately captured to use as a benchmark, in order to determine the experiment's effect Metrics data from before that period can be filtered out. Only the Metrics data within the time periods specified for one or more experiments (and/or variants) is needed (and possibly a tail of data extending for some limited period of time afterward).

Figure 2:
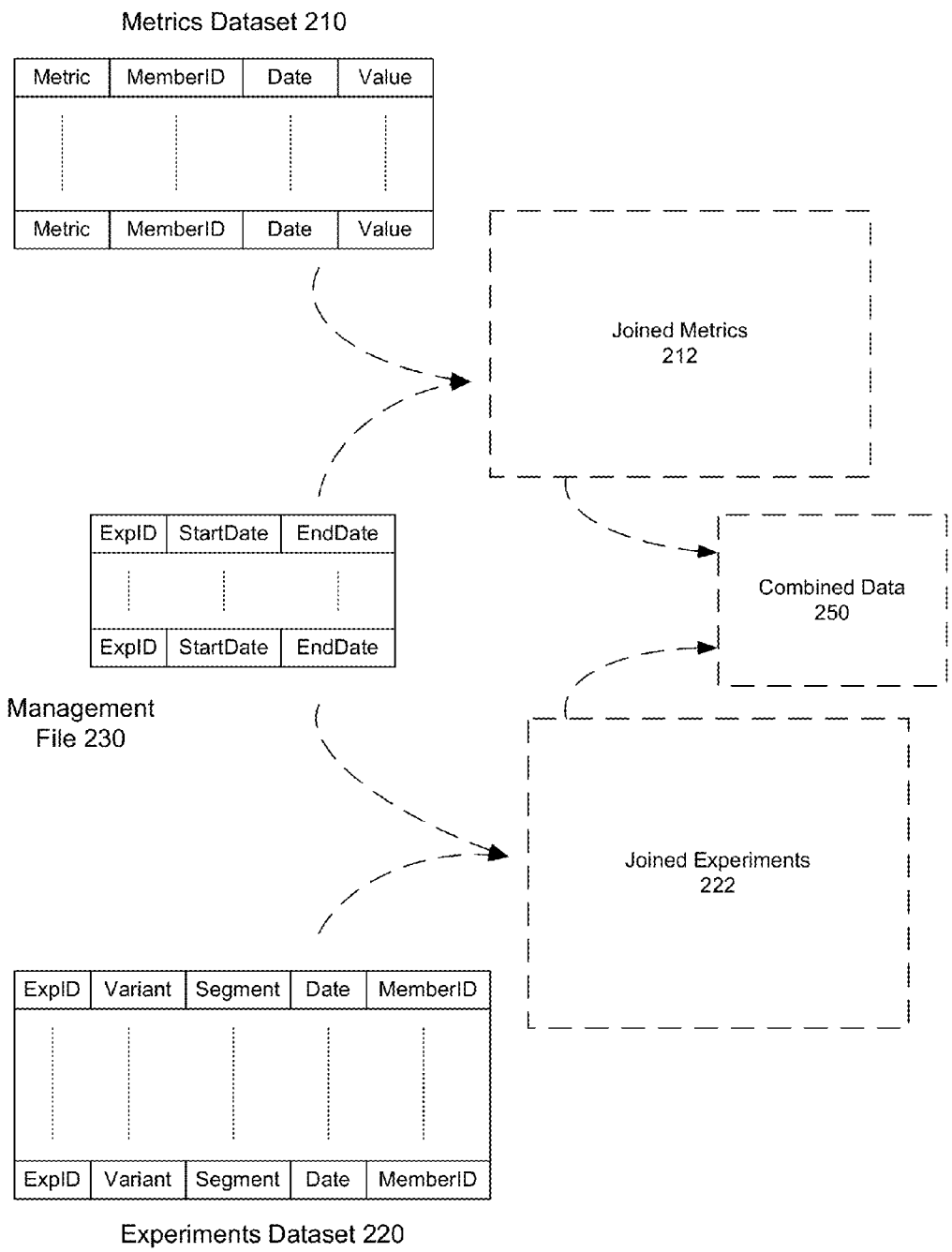
FIG. 2 is a block diagram demonstrating a traditional joining of two datasets.

FIG. 2 depicts the traditional data processing involved in this scenario. In FIG. 2, illustrative schemas are shown for Metrics dataset 210, Experiments dataset 220, and management file 230.

Each record in Metrics dataset 210 includes the name of a metric, an ID of a member, a date, and a value for that metric for that member on that date, and may be generated by the system on a daily basis.

Each record in Experiments dataset 220 includes an ID of an experiment, a variant of that experiment (i.e., an identifier of the variant), a member segment, a date, and an ID of a member that was given or exposed to the experiment and variant on that date. The member segment may illustratively specify one or more member attributes/values that indicate which members or types of members should be exposed to the experiment and variant (e.g., 20<age<30, gender=female, industry=sales or marketing).

Each record in management file 230 includes an experiment identifier and a starting date and ending date for which metric information (e.g., mean, variance) is desired. The experiment identifier in management file 230 may identify a particular experiment, a particular variant, or a combination of an experiment and a variant.

To provide a sense of scale, the Metrics dataset may include approximately 70 billion records (not all members are active all the time), and the Experiments dataset may hold approximately 250 billion records. The two datasets may span or represent multiple (e.g., 2, 3) months. In other implementations, the time period may be shorter and the datasets may be correspondingly smaller.

Traditional processing of datasets 210, 220 would involve, as shown in FIG. 2, Joining the datasets according to management file 230 to include all relevant data (e.g., metrics captured during any active experiment). This would yield Joined metrics data 212 and Joined experiments data 222. Because each record in Metrics dataset 210 and Experiments dataset 220 could be replicated many times (e.g., for each experiment and variant), the size of intermediate data collections 212, 222 could reach hundreds of billions or even trillions of rows. Those gargantuan data collections would then be Merged, Joined, Aggregated, or otherwise combined to form combined data 250, which could be analyzed to yield the desired information—such as the mean values of each metric for each experiment/variant, the variance, etc. Such processing could require tens of hours, thereby significantly delaying acquisition of results of an experiment.

In sum, obtaining desired information from two or more large datasets traditionally requires Joining them on one or more common columns (or dimensions or fields), such as member ID in the example of FIG. 2, and computing an aggregate on some different set of columns, such as metric values and experiments/variants, and possibly repeating this over multiple time ranges.

Figure 3:
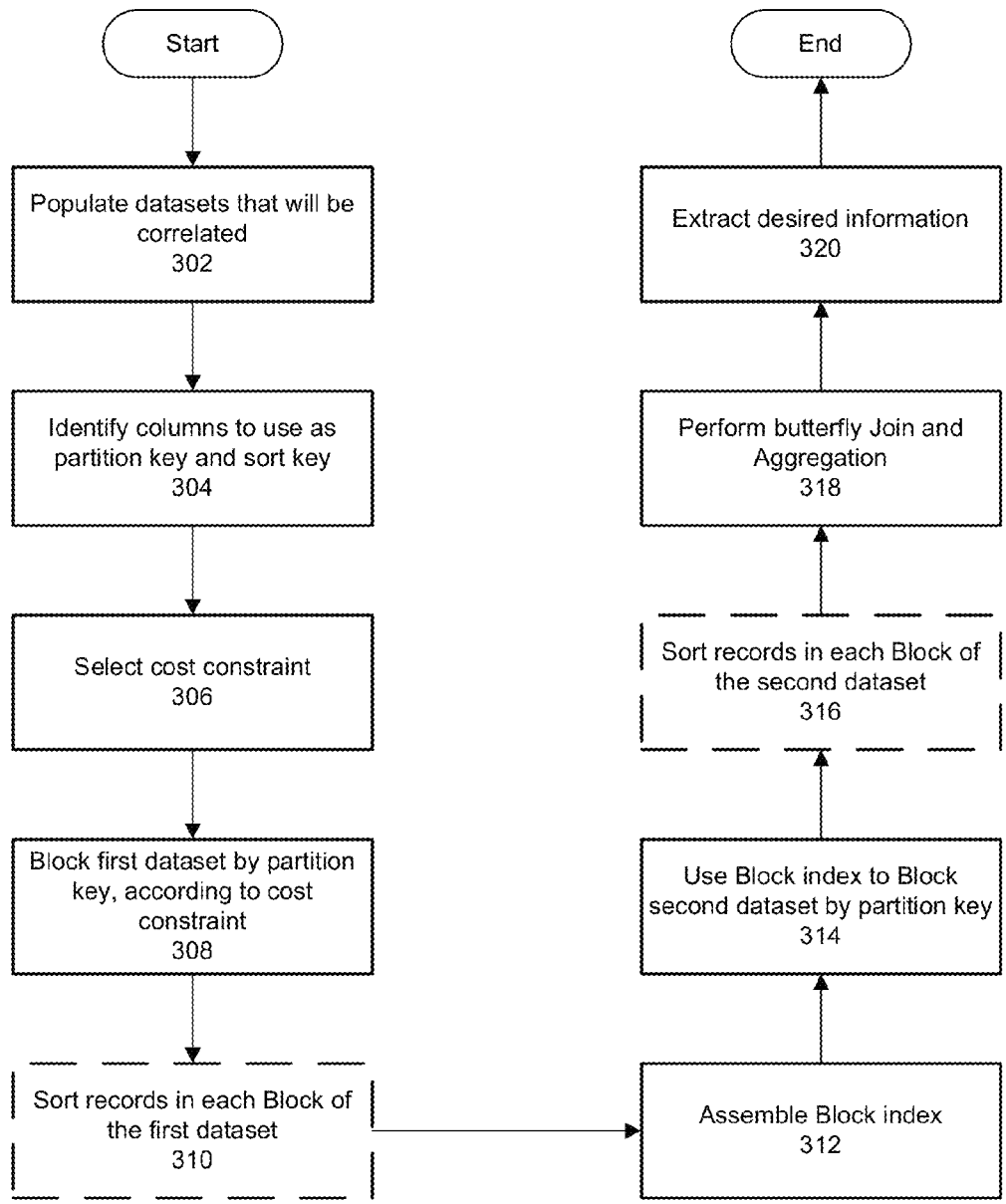
FIG. 3 is a flow chart illustrating a method of processing large datasets, in accordance with some embodiments.

FIG. 3 is a flow chart demonstrating a method of Blocking data, according to some embodiments. This method is described as it may be implemented to Block the data involved in the scenario described immediately above and depicted in FIG. 2. In particular, the method of FIG. 3 may be applied to strategically partition the Metrics and Experiments datasets for further processing, such as to facilitate a Join or Aggregation operation, or to otherwise analyze the combined data, without having to perform Joins or other combination operations on humongous sets of data in their entireties.

In operation 302, the datasets are accumulated over some period of time. For example, metric values for some or all members are calculated and stored in the Metrics dataset every day, every hour, or with some other regularity. The dataset may therefore include one or more separate data files or databases. Accumulating metrics data may involve tracking each member's activity while connected to the system, counting each metric (e.g., each page view, each communication sent, each posting) at the end of some time period (e.g., each day), then storing the values in the Metrics dataset.

The Experiments dataset is similarly populated over some period of time that overlaps with the time period of the Metrics dataset—which may or may not be the same time period as that reflected in the Metrics dataset. Illustratively, each time a member is exposed to a variant of an experiment, the Experiments dataset is updated to record that action.

Another dataset, management file, or control data may be created to identify data for which some analysis is desired. For example, a management file such as that depicted in FIG. 2 may be populated to identify specific experiments (or experiment variants) that are of interest, one or more time ranges for each experiment, specific metrics of interest, etc. This control data may be used during and/or after Blocking the datasets, to assist with the desired analysis, such as to find out the effects of the specified experiments on the specified metrics.

In operation 304, one or more columns, fields, or dimensions of the data, which are common to both datasets, are chosen as the partition key. In the example scenario, the member ID field would likely be chosen as the partition key. In some embodiments, multiple fields may be used, such as a combination of member ID and date. Each Block that is defined for a dataset will include all records from that dataset that have values in the subset of partition key values that have been assigned to that Block.

In embodiments reflected in FIG. 3, a partition key is selected such that the desired query or calculation, or the queries/calculations necessary to produce the requested information, is parallelizable along the selected column or columns. It particular, in these embodiments it is necessary to be able to execute the query on non-overlapping subsets of the data sets, as partitioned according to the partition key, and then compute the final answer by applying the necessary function or functions over the partial results obtained from individual partitions.

A sort key is also chosen, for sorting data records within each Block. Illustratively, the sort key for Blocks of the Metrics dataset may be the metric column, which identifies one metric, and the sort key for Blocks of the Experiments dataset may be a combination of the experiment column (e.g., experiment ID) and the variant column (e.g., variant ID). In these embodiments, the sort key is an internal property to the dataset Blocks, and is not global.

In operation 306, a cost or performance constraint is selected, for use in identifying boundaries between Blocks. One illustrative and effective constraint is size. For example, a size limitation may be implemented to require each Block of a selected dataset to be small enough to fit within the memory space allocated to one process within a computer system. Illustratively, if a normal process is allocated 100 MB of memory space, the cost constraint may specify that each Block of the selected dataset can be no larger than 100 MB, 95 MB, 90 MB, or some other suitable value.

The data processing discussed herein may be performed within a parallel computing environment in which separate processes manipulate different blocks in parallel. By limiting Block size based on the processes' memory space, their processing can proceed at memory speeds and not have to swap data to secondary storage during their calculations.

In other implementations, other cost constraints may be applied, such as a maximum number of rows in a Block, a maximum number of partition key values, or a constraint on a derived property. As an example of the latter, the cost constraint may be a constraint on the number of result tuples produced by a deterministic aggregation operation (e.g., it may be upper-bounded to a user-specified threshold).

In operation 308, one of the datasets (e.g., the Metrics dataset) is Blocked based on the partition key and in consideration of the cost constraint. Each Block is created by identifying or selecting a set of partition key values such that all records in the dataset having those values in the partition key field(s) can be combined without violating the cost constraint.

For example, if the cost constraint is the size or amount of memory space allocated to a CPU process, all dataset records having one or more selected partition key values are identified such that their total size is less than or equal to that memory size (e.g., 100 MB). The selected partition key values are preferably sequential (although this is not required in all implementations), and each Block may vary in size, with some close to the maximum size and others much smaller.

In optional operation 310, the records within each Block are sorted according to the sort key, which is usually different than the partition key. For example, for the Metrics dataset of FIG. 2, the primary sort key may be metric (i.e., the name or other identifier of a specific metric) and a secondary sort key may be member ID. A date field may be a tertiary sort key or may be an alternative secondary key.

In operation 312, an index is assembled to reflect the Blocking of the first dataset. The index may be stored in memory or in secondary storage, but will identify each Block of the first dataset, indicate where the Block is stored, and identify the Block's partition key values. In practice, the index may be assembled throughout operation 308. For example, as each Block is defined, a corresponding entry may be made in the index.

Figure 4:
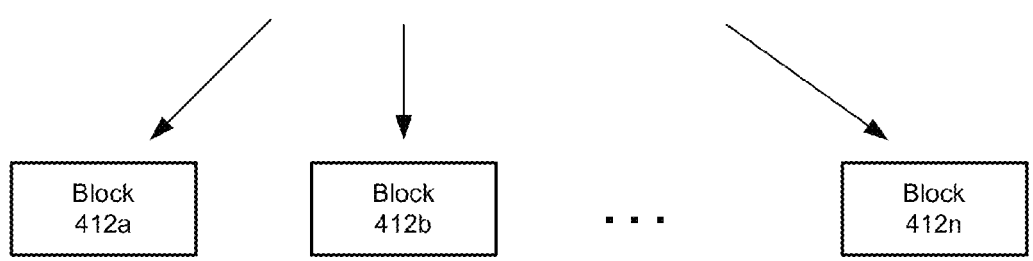
FIG. 4 is a block diagram of the Blocking of a dataset and generation of a corresponding Block index, in accordance with some embodiments.

FIG. 4 illustrates the partitioning of a first dataset 410 into Blocks 412, and the creation of Block index 440, according to some embodiments. Each Block comprises a set of records from first dataset 410 (e.g., Metrics dataset 210 of FIG. 2) having non-overlapping values in the partition key column(s), and every record in dataset 410 is contained in one (and only one) Block. Block 412a consists of records having a first subset of partition key values, Block 412b consists of records having a second subset of partition key values, and so on. The Blocks may be of varying sizes, but each satisfies the applicable cost constraint.

Block index 440 includes an entry for each Block, sorted by Block ID 440a, which identifies by filename 440b a file in which the Block is stored, an offset 440c of the Block within the file, and length 440d of the Block. Partition key range field 440e identifies the Block's partition key values (e.g., as a starting value and ending value of a sequence of partition key values). Multiple Blocks may be stored in one file, and different files may store different numbers of Blocks.

In operation 314 of the flow chart of FIG. 3 the second dataset (e.g., Experiments dataset 220 of FIG. 2) is Blocked, using the Block index generated during Blocking of the first dataset. In particular, the Blocks of the second dataset are defined by the partition key values of the first dataset's Blocks. As a result, for every set or sequence of partition key values in the Block index, there will be a corresponding pair of Blocks from the two datasets that encompass those values.

Because the boundaries of Blocks created from the second dataset depend on the boundaries (i.e., partition key value ranges) selected during Blocking of the first dataset, the cost constraint is not applied during Blocking of the second dataset. Therefore, the sizes of the second dataset's Blocks would not be limited as described above regarding the first dataset's Blocks.

As one of ordinary skill in the art will appreciate, the ranges of partition key values encountered in the two datasets prior to Blocking may not match. In some embodiments, therefore, the partition key value ranges selected during Blocking of the first dataset may encompass all possible values for the partition key column(s) instead of just those actually contained in the dataset. For example, if the partition key field is a member ID field and the member IDs cited in the dataset span a range from 89 to 436, but valid member IDs span a larger range of, say 1 to 500, the ranges assigned to the Blocks may account for this. Thus, the first Block's partition key value range may be from 0 to 147 instead of 89 to 147, and the final Block's range may be from 398 to 500 instead of from 398 to 436, for example. As a result, the Block index will encompass all possible ranges of partition key values encountered in the second dataset.

Alternatively, the partition key ranges initially reflected in the Block index may only reflect the actual partition key values encountered in the first dataset. Then, during Blocking of the second dataset, a given Block's range of partition key values may be expanded to include a partition key value not already represented in the Block index. Generally, this expansion would likely only be necessary for the first Block and/or the last Block.

In optional operation 316, records in each Block of the second dataset may be sorted according to a second sort key that is usually different than the partition key. For example, for the Experiments dataset of FIG. 2, the primary sort key may be experiment ID and a secondary sort key may be variant (i.e., a name or other identifier of a variant). Member ID or date may be a tertiary sort key or an alternative secondary key.

In operation 318, a "butterfly" Join/Aggregation operation is performed on each corresponding pair of Blocks from the two datasets (i.e., the Blocks corresponding to the same range of partition key values)—a first Block from the first dataset and a second Block from the second dataset.

In some implementations, the entire first Block is held in memory (the cost constraint may ensure that this is possible), and sub-blocks of the second Block are read and applied to the entire first Block. In the example datasets of FIG. 2, and with both Blocks being sorted as described in operations 310, 316, each sub-block of the first Block may include all records for one metric, and each sub-block of the second Block may correspond to a unique experiment/variant combination (or, more generally, to a unique value of the Group by key).

Therefore, the Join/Aggregation allows each individual metric of the first Block to be correlated with each experiment/variant of the second Block, to identify members exposed to a given experiment/variant and aggregate those members' metrics. In turn, each sub-block of the second Block is read and correlated with each sub-block of the first Block.

More specifically, the first Block is held in memory while the second Block is streamed from disk, one sub-block at a time. Thus, only one sub-block of the second Block must be held in memory at one time. That sub-block is iteratively Joined with each sub-block of the first Block, the results are Aggregated as described below, and then the next sub-block of the second Block is read and processed.

After the last sub-block of the second Block has been read and Joined with all sub-blocks of the first Block, and the results Aggregated, all processing necessary for the member IDs that correspond to the two Blocks is complete.

The Joins between individual sub-blocks of the first Block and the Second Block identify the rows of the two datasets that are actually correlated (i.e., that have the same value for the partition key and that occur during the same time period of interest—assuming a time period is identified). The aggregation of the Joined data accumulates the metric values for these rows into a single corresponding Group by Key, which may illustratively be of the form (metric, experiment, variant, date range). Thus, the intermediate output produced by the Joined sub-blocks is immediately Aggregated and never needs to be saved to secondary storage.

Therefore, these Join/Aggregation data operations can proceed at memory speeds, without being hampered by constant or regular input/output issues (e.g., disk swaps), and allow running totals of metrics and/or other information to be gathered.

In operation 320, the desired information is extracted or reported after all pairs of corresponding blocks have been correlated. Thus, the system can readily calculate means of metric values of all members who were exposed to given experiments/variants, for example. The intelligence or information that may be derived from the described process is limited only by the contents of the datasets that have been Blocked and Joined/Aggregated.

The method illustrated in FIG. 3 allows "on-the-fly" calculation or assembly of the desired intelligence, because the Blocking of the datasets allows portions of the necessary information to be computed and added to previously computed information, without huge Join operations across all dataset records. In particular, as each pair of corresponding Blocks is processed, all metric values for all members represented in the Block and exposed to a given experiment/variant can be combined. Each succeeding pair of corresponding blocks adds to the combined information.

Thus, in our example of metrics and experiments, sub-totals of metric values for each experiment/variant for a subset of all members are computed from each pair of corresponding Blocks. Illustratively, tuples in the form (metric, experiment, variant) can be assembled, plus a date range if desired. Each time a sub-block of a second Block, which contains all (experiment, variant) data for a set of members, is sub-Joined with the sub-block of a first Block that correspond to a particular (metric), the tuple for that metric can be updated (e.g., to sum the metric values of those members for that experiment/variant).

After all Blocks are processed, the tuples can be used to calculate the mean metric value across all members, the variance, and/or other results.

Because each Block contains all data records that contain a corresponding partition key value, efficient time-range calculations are enabled over the entire period of time reflected in the data (or any portion of that time period), which could be weeks or months. In particular, all time values for the partition key (e.g., all data for a particular group of members) are available at the same (compact) location and suitable for rapid processing. One illustrative format for tuples in which date ranges are also captured is (metric, experiment/variant, date range), wherein information identifying both an experiment and a specific variant are combined into one field.

One of skill in the art will recognize that the unique process described above, in which multiple datasets are partitioned according to a partition key, sorted based on a sort key, and then joined via a "Butterfly" Join (i.e., by joining and aggregating corresponding blocks of each dataset), reduces intermediate memory requirements to a constant level. In particular, for every result that is being calculated, which corresponds to a unique tuple (e.g., (metric, experiment/variant, date range)), the only memory requirement is that the running result be stored in memory. This may be contrasted with traditional methods of joining massive datasets, which require hash tables and simultaneous retention of multiple results. Instead, a method such as the method of FIG. 3 can perform a full aggregation of relevant data without ever spilling to disk.

In general, the method depicted in FIG. 3 may be applied in any situation in which two large datasets (e.g., Set1 and Set2) need to be Joined on a common column (e.g., Set1.alpha=Set2.alpha) followed by an Aggregation performed in a Group by Key manner (e.g., Set1.beta, Set2.gamma) in order to generate or support a statistical function such as MEAN(Set1.delta).

In this abstract scenario, the partition key would be chose as the Join column alpha (i.e., Set1.alpha, Set2.alpha). The internal sort key for the Blocks would be the datasets' contributions to the Group by Key operation (i.e., Set1.beta, Set2.gamma). In SQL, this query may be expressed as Select MEAN(Set1.delta) from Set1, Set2
   where Set1.alpha=Set2.alpha
Group by Set1.beta, Set2.gamma.

In some embodiments, more than two datasets may participate in a process described herein. For example, if the Metrics and Experiments datasets of FIG. 2 were to be correlated within different time ranges, which may be specified in a management file or control file, that management data may be a third dataset that is correlated with the Blocks formed from the Metrics and Experiments datasets. In this embodiment, the Metrics and Experiments datasets may be Blocked in the same (or a similar) manner as described in conjunction with FIG. 3, and those Blocks may be then be combined with separate date ranges of the management file, such that each pair of corresponding Blocks (of the Metrics and Experiments datasets) are correlated multiple times, for each date range.

In other embodiments, Blocking just a single dataset may be useful to facilitate analysis of that data. For example, it may be desirable to analyze the large Metrics database of FIG. 2 to determine how one or more metric values have changed over a week, a month, a year, or some other time period, for all or for some members. Because the dataset may consist of hundreds of billions of records distributed among many separate files (e.g., each day's member activities may be captured in a separate folder, analyzing one member's metric values in a traditional manner may be time- and resource-intensive.

However, by Blocking the dataset by member ID, and sorting each Block by metric or by metric and date, all data necessary to calculate one member's historical metric values are available together for on-the-fly computation.

In some embodiments, after a given dataset is Blocked, additions or updates to the datasets (e.g., a new day's worth of metrics) may be added to the dataset's Blocks opportunistically and without redoing the entire Blocking operation. For example, assume Metrics dataset 210 of FIG. 2 is an aggregation of members' metrics over time, and is updated daily after the members' metrics for that day (or the previous day) are computed.

In these embodiments, the new data (e.g., the daily update) is Blocked on the same partition key and with the same partition key value ranges that are reflected in the existing Block index, to form incremental Blocks. Advantageously, this incremental Blocking may be performed when the dataset's Blocks are being Joined/Aggregated with the Blocks of another dataset (e.g., the Experiments dataset). A virtual combined Block may then be formed by abstractly (but not necessarily physically) merging the original Block and the incremental Block, and the virtual Block may be presented for Joining/Aggregating with the other dataset's corresponding Block. (e.g., in operation 318 of the method depicted in FIG. 3).

The incremental Block can then be physically merged with the original Block and the Block index can be updated (e.g., with the updated offsets and lengths of the Blocks) after the Join/Aggregation, in a deferred manner that does not interfere with or delay the Join/Aggregation, perhaps at a later time when there is little or no contention for system resources.

Eventually, a Block boundary (i.e., the partition key values that divide Blocks) may change because an incremental Block cannot be merged with a corresponding original Block without violating the applicable cost constraint. In this case, and because the merge operation may proceed in sorted order of the partition key values (e.g., from low to high), the new boundaries are identified and a replacement Block index is generated accordingly.

In some embodiments, Blocking a dataset (or datasets) and/or subsequent data operations may be performed in a parallel processing computing environment. For example, multiple processes running on separate computers may work cooperatively.

Figure 5A:
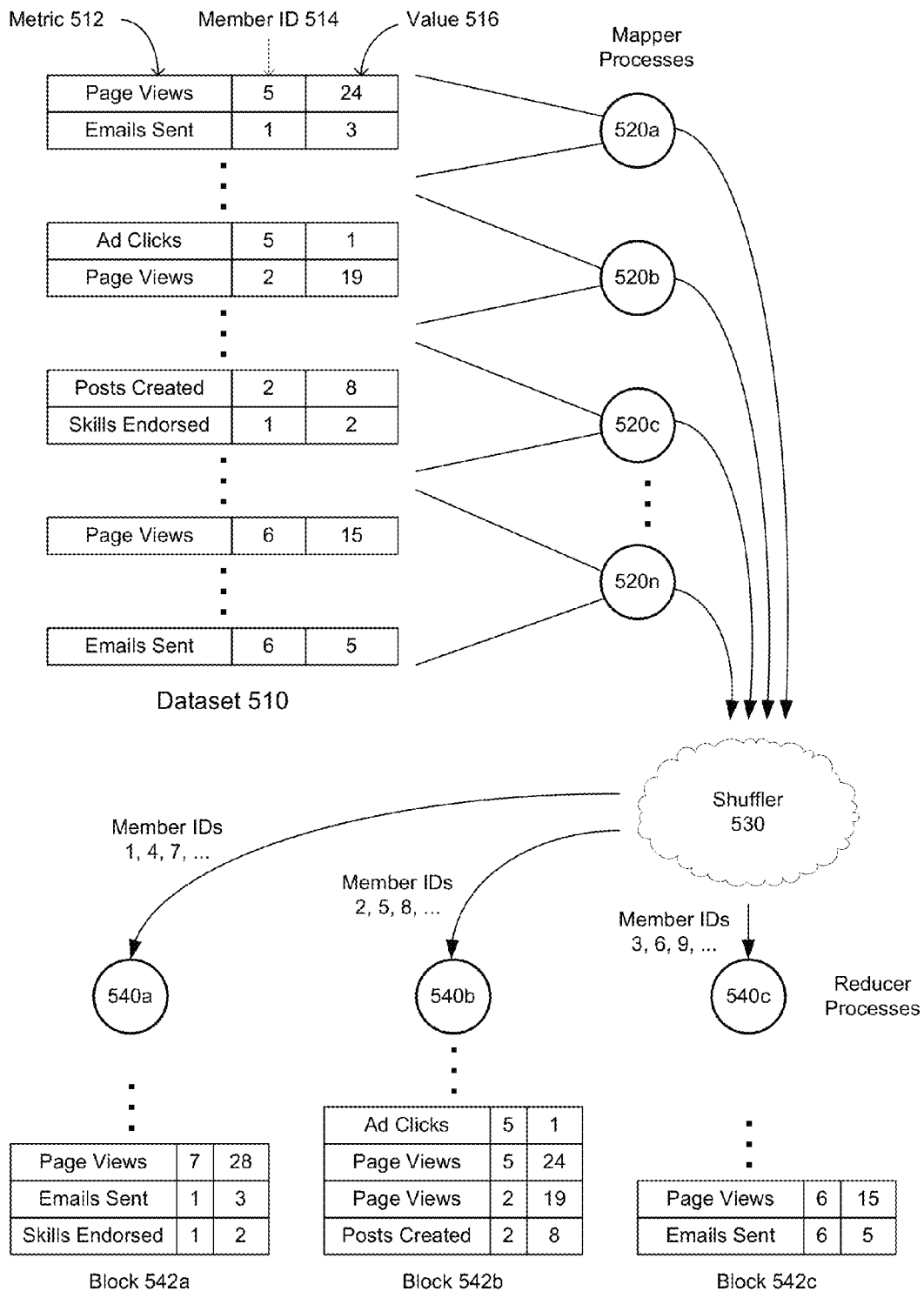
FIGS. 5A-B illustrate the Blocking of two inter-related datasets in a parallel-processing computing environment, in accordance with some embodiments.
Figure 5B:
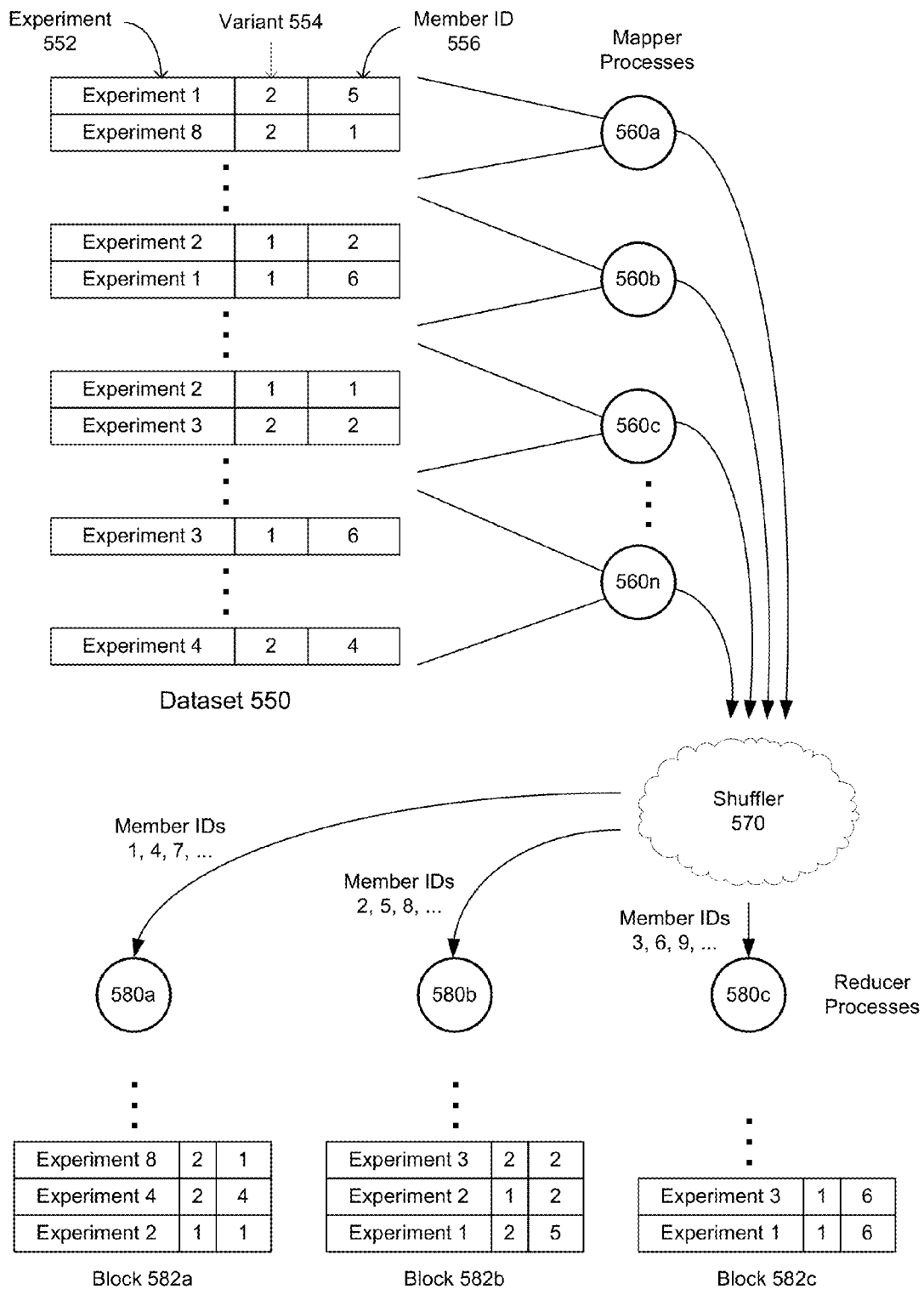

FIGS. 5A and 5B demonstrate parallel processing to promote Blocking and analyzing large sets of data, according to some embodiments. FIG. 5A illustrates the Blocking of a first dataset, and FIG. 5B illustrates subsequent Blocking of a second dataset using the index generated by Blocking the first dataset.

In these embodiments, separate mapper processes 520 and reducer processes 540 execute on separate computer systems, which may be physical or virtual. Dataset 510 is a reduced version of Metrics dataset 210 of FIG. 2, unsorted, wherein each record includes three columns or fields: metric 512, member ID 514, and metric value 516. Illustratively, a given record reveals the total value of the specified metric for the specified member (e.g., page views, logins, other members skills that were endorsed by the specified member), and the records are unsorted. The member ID field will be used as the partition key.

Blocking of dataset 510 begins by dividing the dataset among the n mapper processes, so that each record is handled, or mapped, by one process. Different mapper processes 520 may receive different numbers of records, but in some embodiments the division is approximately equal.

A mapper process 520 emits or outputs to shuffler process 530 the partition key value of each record that it handles, along with the rest of the record. In particular, for each record of dataset 510 that it consumes, a mapper process emits a tuple that may be similar in form to (key, value), wherein the key is the value of the partition key for the record, and the value is the record itself.

Depending on the key of each tuple it receives from the mapper processes, shuffler process 530 sends the entire emission (or just the value portion) to one of the reducer processes 540. In particular, all dataset records having the same partition key value will be delivered to the same reducer process 540.

In the illustrated embodiment, three reducer processes are instantiated, on the same or different computers, and each one receives a subset of all possible (or all encountered) partition key values. For example, a modulo operation may be performed by shuffler process 530 to determine which reducer process is to be responsible for which set of partition key values. In this example, reducer process 540a receives records having member IDs 1, 4, 7, . . . , reducer process 540b receives records having member IDs 2, 5, 8, . . . , and reducer process 540c receives records having member IDs 3, 6, 9, . . . .

To compose a block (e.g., blocks 542a, 542b, 542c), the records received by each reducer process are sorted by their partition key values, or received in order of their partition key values, and entire sets of records having the same partition key value are combined until no other set of records for another partition key value can be added to the same block without violating the cost constraint.

In some implementations, the sorting of records by partition key values may be performed when they are received by the reducer processes, in which case blocks may not be definitively delineated until all records having a particular partition key are received. In other implementations, this sorting is performed by the mapper processes 520, meaning that they may process their portions of dataset 510 in order of partition key value (e.g., from lowest to highest). In yet other implementations, shuffler 530 may perform or assist with sorting, such as by sending the data records it receives from the mapper processes in order of their partition key values.

In some implementations in which the applicable cost constraint is the size of a Block and in which Blocks are not compressed, a reducer process may apply the constraint to a collection of records (i.e., all records having particular partition key values), and then apply the selected sort key to that collection. In some other implementations in which Blocks are compressed, the compression ratio may be estimated and, if it turns out that an estimated ratio was over-estimated, some records (e.g., all records having a particular partition key value) may be moved to a different block if necessary.

Thus, in all cases, a reducer process is able to start with the lowest partition key value assigned to it, add to one block all of the data records it receives with that partition key, then identify all of the data records with the next highest partition key value, and determine whether those records will also fit in the one block. If so, they are added and the next partition key value's records are analyzed; if not, the one block is closed and a new one started and initially populated with this set of records.

As a reducer process populates each block 542, or after the Block is closed, it may sort the Block's records according to the specified sort key, which in this example may be metric 512. In situations in which the cost constraint is memory size that is no greater than the memory available to each reducer process, a reducer process can store an entire block in memory and can therefore sort it quickly.

As described above, therefore, the result of the Blocking operation is a set of Blocks containing all records of dataset 510 that have a specified set of partition key values, and those records may be sorted by the sort key. Each reducer process 540 that receives at least one record from shuffler 530 may generate any number of Blocks (i.e., one or more).

In FIG. 5B, dataset 550 is a reduced version of Experiments dataset 220 of FIG. 2, unsorted. Each record contains experiment ID 552, variant ID 554, and member ID 556. As with dataset 510, each of multiple mapper processes 560 receives and processes a portion of the dataset.

However, in the Blocking of dataset 550, based on the index generated by Blocking dataset 510, the mapper processes have more work than they did in Blocking dataset 510 of FIG. 5A. In particular, they must identify which Block each record of dataset 550 belongs to. To facilitate this work, each mapper process stores a copy of the index (or at least a mapping of partition key values (i.e., member IDs) to their corresponding blocks).

As it processes each record in its portion of dataset 550, a mapper process 560 reads the partition key value, looks up the corresponding Block number in the index, and emits a (key, value) tuple. In the illustrated embodiment, the value field of this tuple is the entire data record, and the key field includes both the partition key value and the value of the specified sort column(s) (e.g., experiment ID 552/variant ID 554).

This will allow reducer processes 580 to sort the contents of each Block it assembles, as it assembles it. Because the cost constraint does not apply during Blocking of a second dataset based on an index assembled during Blocking of a related dataset, there is no guarantee that the contents of an entire Block created by a reducer process 580 will fit into memory.

Shuffler process 570 receives the emissions of the mapper processes, reads the key fields, and forwards the data records to the appropriate reducer processes 580. All records destined for the same Block will be delivered to the same reducer process. Depending on the ratio of reducer processes to Blocks, a reducer process may assemble more than one Block (i.e., if there are few reducer processes than Blocks).

In the illustrated embodiment, shuffler process 570 outputs records it receives from the mapper processes to the responsible reducer process in the order of their sort key values (and may have received them in sorted order from the mapper processes). This allows the reducer process to populate the Block in sorted order, and obviates any need for the reducer to perform its own sort operation.

Figure 6:
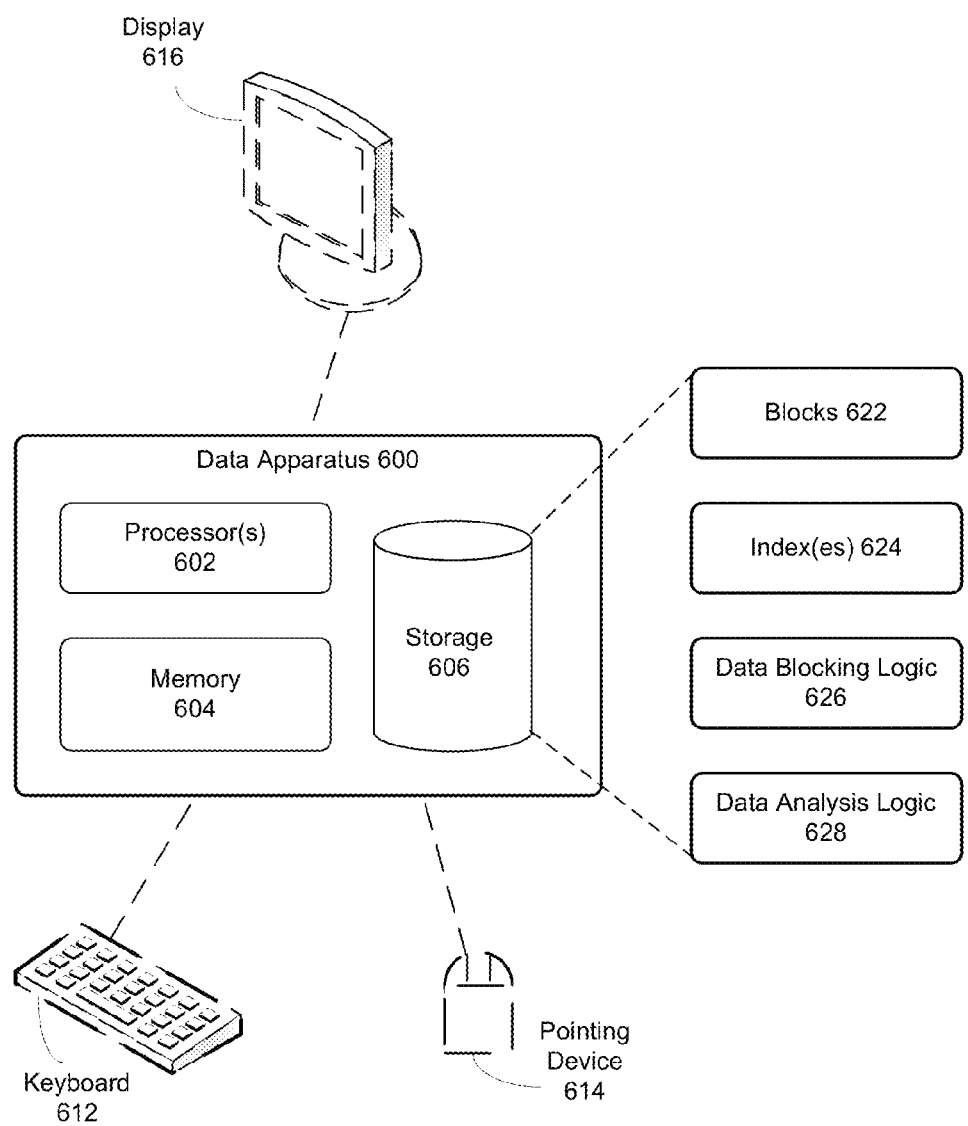
FIG. 6 is a block diagram of an apparatus for Blocking a massive dataset, according to some embodiments.

FIG. 6 is a block diagram of an apparatus for organizing and joining massive sets of data, according to some embodiments.

Data apparatus 600 of FIG. 6 comprises processor(s) 602, memory 604, and storage 606, which may comprise one or more optical, solid-state, and/or magnetic storage components. Storage 606 may be local or remote to the apparatus. Data apparatus 600 may be coupled (permanently or transiently) to keyboard 612, pointing device 614, and display 616. Multiple data apparatuses 600 may operate in parallel to cooperate in the Blocking and/or other processing of one or more datasets, and storage 606 may be shared among them, or may represent their combined secondary storage resources.

Storage 606 stores data Blocks 622, which were derived from one or more datasets that are also stored on apparatus 600 or external to the apparatus. Depending on the computing environment in which apparatus 600 is deployed, the original dataset(s) may contain data regarding user activities at an online service, an organization's internally generated data, testing data, etc. In general, however, the original data are so voluminous as to make it difficult to process the data and extract desired intelligence in a timely manner using traditional methods such as joining multiple entire datasets or attempting to perform a query on an entire dataset.

Storage 606 further includes one or more indexes 624 assembled during the creation of data Blocks 622. Each index pertains to one partition key, which comprises one or more columns of the dataset(s) that produced Blocks 622. As described previously, a given index may be used to Block multiple datasets that feature the same partition key column(s).

Storage 606 also stores logic that may be loaded into memory 604 for execution by processor(s) 602. Such logic includes data Blocking logic 626 and data analysis logic 628. In other embodiments, these logic modules and/or other content may be combined or divided to aggregate or separate their functionality as desired.

Data Blocking logic 626 comprises processor-executable instructions for Blocking a set of data according to a specified partition key, possibly while adhering to an applicable cost constraint. Logic 626 may also handle creation of index(es) 624.

Data analysis logic 628 comprises processor-executable instructions for analyzing Blocked data in response to a query or inquiry. Such analysis may include Joining or Aggregating corresponding Blocks of different datasets (i.e., Blocks generated according to the same partition key values), performing on-the-fly calculations as individual Blocks (or sub-Blocks) are held in memory, etc.

In some embodiments of the invention, data apparatus 600 performs most or all of the functions described in relation to data server 118, and possibly query server 120, of FIG. 1. In some particular implementations, apparatus 600 may host multiple virtual computer servers performing the functions of servers 118, 120 (and/or others) of FIG. 1.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of correlating multiple multi-dimensional datasets, the method comprising:
   selecting one or more dimensions of a first dataset as a partition key;
   selecting a cost constraint;
   dividing the first dataset into a first set of blocks with one or more computers, said dividing comprising, for each block in the first set of blocks:
   associating with the block a distinct subset of partition key values such that a combination of all records of the first dataset having partition key values within the associated subset of partition key values satisfies the cost constraint;
   collecting all records of the first dataset having partition key values within the associated subset of partition key values;
   sorting the collected records using a sort key comprising one or more of the dataset dimensions other than the partition key; and
   writing the block to storage after said collecting and said sorting;
   dividing a second multi-dimensional dataset that includes the partition key into a second set of blocks; and
   correlating the first dataset and the second dataset by:
   for each pair of corresponding blocks in the first set of blocks and the second set of blocks, the corresponding blocks consisting of a first block in the first set of blocks and a second block in the second set of blocks:
   storing the first block in memory;
   for each of multiple sub-blocks of the second block, correlating the sub-block with the first block; and
   aggregating the correlations between the first block and each of the multiple sub-blocks of the second block.

2. The method of claim 1, wherein the cost constraint is a maximum storage size of the collected records.

3. The method of claim 2, wherein the maximum storage size is configured to allow the collected records to be stored in memory by a single computer process.

4. The method of claim 1, further comprising, for each block in the first set of blocks:
   updating an index to identify:
   the block;
   the subset of partition key values associated with the block; and
   the storage location of the block.

5. The method of claim 4, wherein a plurality of the blocks in the first set of blocks is stored in a single file.

6. The method of claim 4, further comprising incrementally updating the first set of blocks by:
   receiving an incremental update to the first dataset;
   dividing the incremental update according to the index to form incremental blocks corresponding to one or more blocks of the first set of blocks; and
   merging the incremental blocks with corresponding blocks of the first set of blocks;
   wherein a given incremental block corresponds to a block of the first set of blocks having the same subset of partition key values.

7. The method of claim 1, wherein dividing the second multi-dimensional dataset comprises:
   for each record in the second dataset, using the partition key value of the record to assign the record to a block in the second set of blocks; and
   for each block in the second set of blocks, sorting the records assigned to the block using a second sort key;
   wherein each block in the second set of blocks corresponds to a block in the first set of blocks and is associated with the same partition key values as the corresponding block in the first set of blocks; and
   wherein a given record in the second dataset is assigned to the block in the second set of blocks that is associated with partition key values that include the given record's partition key value.

8. The method of claim 1, wherein correlating a sub-block of the second block with the first block comprises:
   storing the sub-block in memory;
   joining the sub-block with each of a plurality of sub-blocks of the first block; and
   aggregating the plurality of joins.

9. The method of claim 1, further comprising:
   prior to said correlating:
   assembling a daily update to the first dataset after dividing the first dataset into the set of blocks;
   dividing the daily update into an update set of blocks corresponding to the first set of blocks; and
   storing the update set of blocks in memory; and
   only after said aggregating:
   physically merging each update block with its corresponding block in the first set of blocks.

10. The method of claim 1, wherein:
    the first dataset comprises computed metrics of users of an online service for a predetermined time period;
    the partition key comprises a user identifier dimension of the first dataset; and
    the sort key comprises a metric identifier dimension of the first dataset.

11. The method of claim 10, wherein:
    the cost constraint ensures each of the multiple blocks of the first set of blocks is able to fit into a memory space allocated to a computer process programmed to join a block of the first set of blocks with a block of a second set of blocks created by dividing a second multi-dimensional dataset comprising the partition key.

12. A non-transitory computer-readable medium storing instructions that, when executed by a processor, cause the processor to perform a method of correlating multiple multi-dimensional datasets, the method comprising:
    selecting one or more dimensions of a first dataset as a partition key;
    dividing the first dataset with one or more computers, said dividing comprising, for each of multiple blocks in a first set of blocks:
    associating with the block a distinct subset of partition key values such that a combination of all records of the first dataset having partition key values within the associated subset of partition key values satisfies the cost constraint;

collecting all records of the first dataset having partition key values within the associated subset of partition key values;

sorting the collected records using a sort key comprising one or more of the dataset dimensions other than the partition key; and writing the block to storage after said collecting and said sorting;

dividing a second multi-dimensional dataset that includes the partition key into a second set of blocks; and correlating the first dataset and the second dataset by:

for each pair of corresponding blocks in the first set of blocks and the second set of blocks, the corresponding blocks consisting of a first block in the first set of blocks and a second block in the second set of blocks:

storing the first block in memory;

for each of multiple sub-blocks of the second block, correlating the sub-block with the first block; and aggregating the correlations between the first block and each of the multiple sub-blocks of the second block.

13. A system, comprising:

a first multi-dimensional dataset;

one or more processors; and memory comprising instructions that, when executed by the one or more processors, cause the system to:

select one or more dimensions of the first dataset as a partition key;

select a cost constraint;

divide the first dataset into a first set of blocks, said dividing comprising, for each block in the first set of blocks:

associating with the block a distinct subset of partition key values such that a combination of all records of the first dataset having partition key values within the associated subset of partition key values satisfies the cost constraint;

collecting all records of the first dataset having partition key values within the associated subset of partition key values;

sorting the collected records using a sort key comprising one or more of the dataset dimensions other than the partition key; and writing the block to storage after said collecting and said sorting;

divide a second multi-dimensional dataset that includes the partition key into a second set of blocks; and correlate the first dataset and the second dataset by:

for each pair of corresponding blocks in the first set of blocks and the second set of blocks, the corresponding blocks consisting of a first block in the first set of blocks and a second block in the second set of blocks:

storing the first block in memory;

for each of multiple sub-blocks of the second block, correlating the sub-block with the first block; and aggregating the correlations between the first block and each of the multiple sub-blocks of the second block.

14. The system of claim 13, wherein the cost constraint is a maximum storage size of the collected records.

15. The system of claim 14, wherein the maximum storage size is configured to allow the collected records to be stored in a portion of the memory allocated to a single process executed by one of the one or more processors.

16. The system of claim 13, wherein the memory further comprises instructions that, when executed by the one or more processors, cause the system to, for each block in the first set of blocks:

update an index to identify:

the block;

the subset of partition key values associated with the block; and the storage location of the block.

17. The system of claim 16, wherein the memory further comprises instructions that, when executed by the one or more processors, cause the system to incrementally update the first set of blocks by:

receiving an incremental update to the first dataset;

dividing the incremental update according to the index to form incremental blocks corresponding to one or more blocks of the first set of blocks; and merging the incremental blocks with corresponding blocks of the first set of blocks;

wherein a given incremental block corresponds to a block of the first set of blocks having the same subset of partition key values.

18. The system of claim 14, wherein dividing the second multi-dimensional dataset comprises:

for each record in the second dataset, using the partition key value of the record to assign the record to a block in the second set of blocks; and for each block in the second set of blocks, sorting the records assigned to the block using a second sort key;

wherein each block in the second set of blocks corresponds to a block in the first set of blocks and is associated with the same partition key values as the corresponding block; and wherein a given record in the second dataset is assigned to the block in the second set of blocks that is associated with the partition key values that include the given record's partition key value.

19. The system of claim 13, wherein:

the first dataset comprises computed metrics of users of an online service for a predetermined time period;

the partition key comprises a user identifier dimension of the first dataset; and the sort key comprises a metric identifier dimension of the first dataset.

20. The system of claim 19, wherein:

the cost constraint ensures each of the multiple blocks of the first set of blocks is separately able to fit into a memory space allocated to a process executed by one of the one or more processors to join a block of the first set of blocks with a block of the second set of blocks.

21. A computer-implemented method of correlating two multi-dimensional datasets, the method comprising:

partitioning a first dataset into a first set of blocks:

selecting as a partition key one or more fields common to the two datasets; and populating each block of the first set of blocks with all records of the first dataset having a partition key value included in a unique subset of partition key values corresponding to the block;

wherein each record of the first dataset is included in no more than one block of the first set of blocks;

partitioning a second dataset into a second set of blocks, by:

associating each block in the second set of blocks with a block in the first set of blocks; and populating each block of the second set of blocks with all records of the second dataset having a partition key value included in the subset of partition key values corresponding to the associated block in the first set of blocks; and correlating the two datasets by:
(a) opening a first block in the first set of blocks;
(b) for each of multiple sub-blocks of the associated second block in the second set of blocks:
1. joining the sub-block with the first block; and
2. aggregating results of the joining with results of joining of other sub-blocks; and
(c) repeating (a) through (b) for all other blocks in the first set of blocks.

22. The method of claim 21, wherein a maximum storage size of each block in the first set of blocks is configured to allow the block to be stored in memory by a single computer process.

23. The method of claim 21, further comprising, for each block in the first set of blocks:
updating an index to identify:
the block;
the subset of partition key values associated with the block; and
the storage location of the block.

24. The method of claim 23, wherein a plurality of the blocks in the first set of blocks is stored in a single file.

25. The method of claim 23, further comprising incrementally updating the first set of blocks by:
receiving an incremental update to the first dataset;
dividing the incremental update according to the index to form incremental blocks corresponding to one or more blocks of the first set of blocks; and
merging the incremental blocks with corresponding blocks of the first set of blocks;
wherein a given incremental block corresponds to a block of the first set of blocks having the same subset of partition key values.

26. The method of claim 21, wherein partitioning the second dataset comprises:
for each record in the second dataset, using the partition key value of the record to assign the record to a block in the second set of blocks; and
for each block in the second set of blocks, sorting the records assigned to the block using a sort key;
wherein each block in the second set of blocks corresponds to a block in the first set of blocks and is associated with the same partition key values as the corresponding block in the first set of blocks; and
wherein a given record in the second dataset is assigned to the block in the second set of blocks that is associated with partition key values that include the given record's partition key value.

27. The method of claim 21, further comprising:
prior to said correlating:
assembling a daily update to the first dataset after partitioning the first dataset;
dividing the daily update into an update set of blocks corresponding to the first set of blocks; and
storing the update set of blocks in memory; and
only after said correlating:
physically merging each update block with its corresponding block in the first set of blocks.

28. The method of claim 21, wherein:
the first dataset comprises computed metrics of users of an online service for a predetermined time period; and
the partition key comprises a user identifier dimension of the first dataset.

* * * * *